June 23, 1936. J. S. PECKER 2,045,051
AIRCRAFT WITH AERODYNAMICALLY ROTATABLE WINGS
Filed Oct. 28, 1932 6 Sheets-Sheet 5

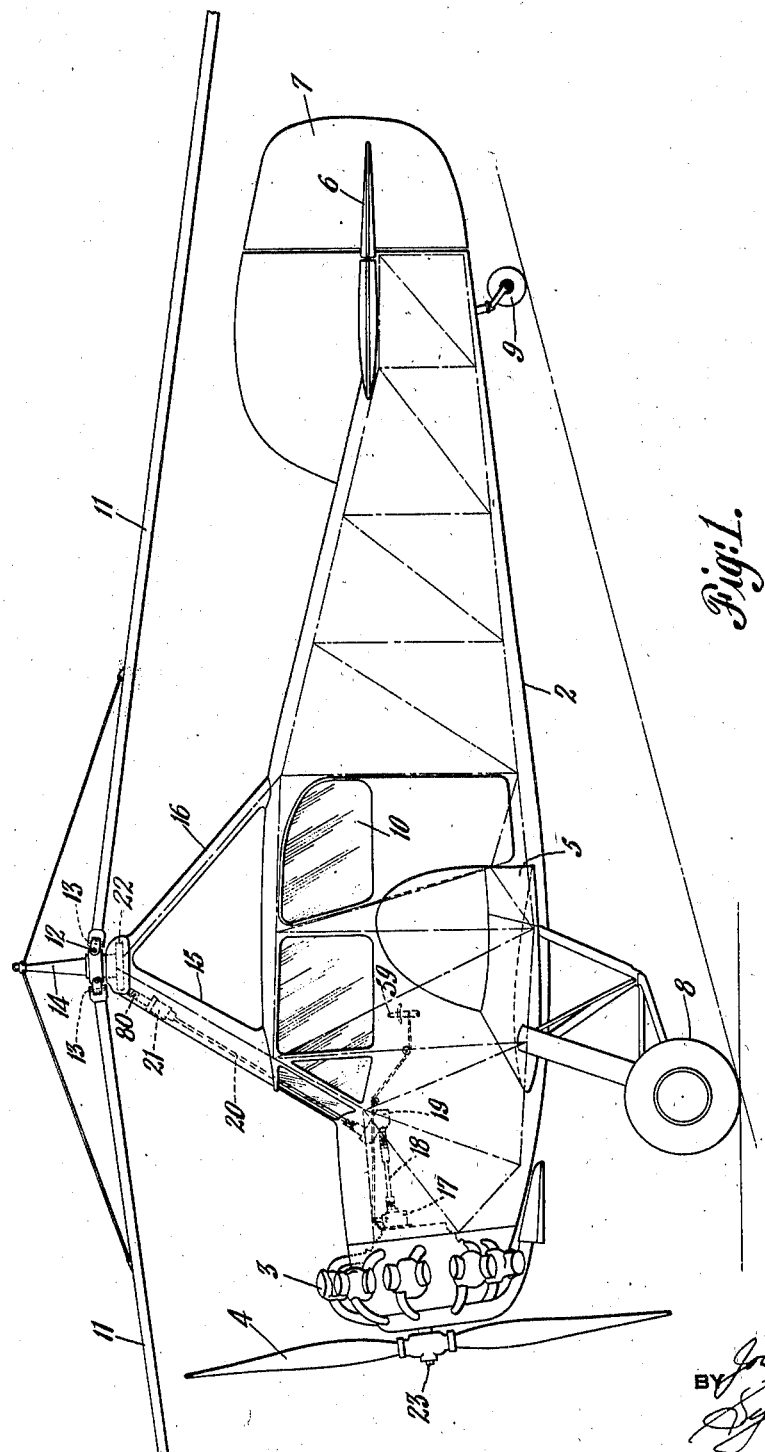

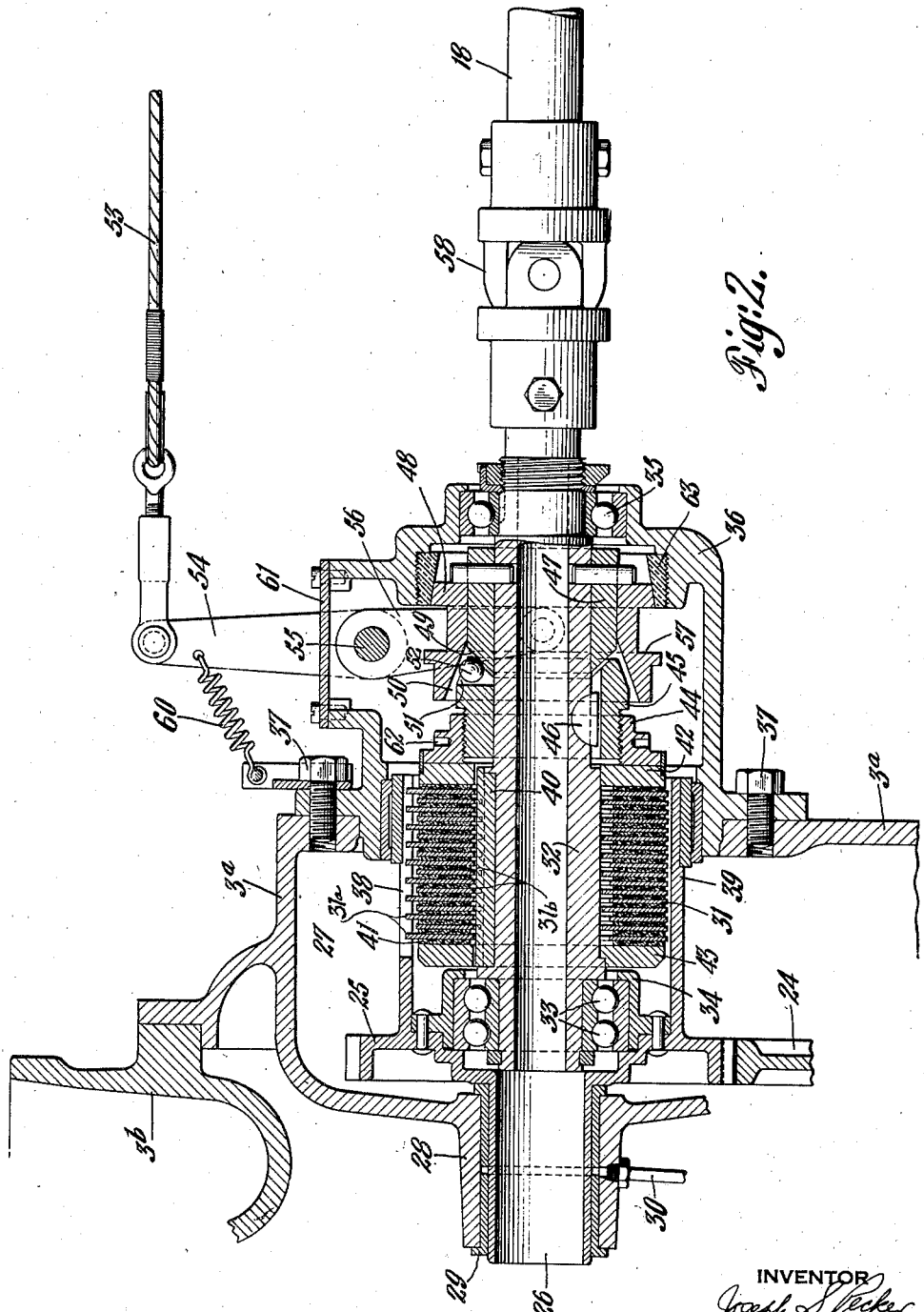

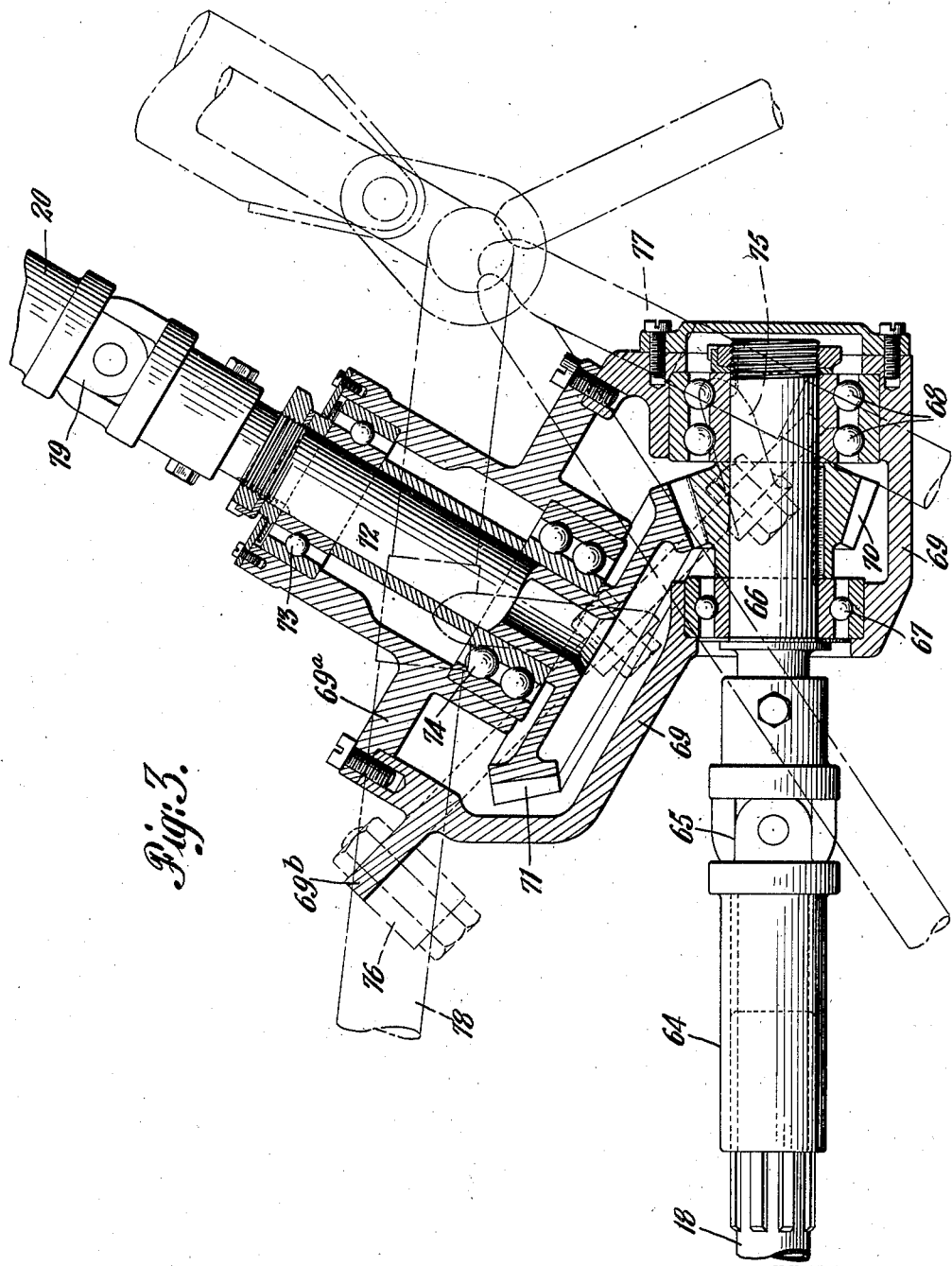

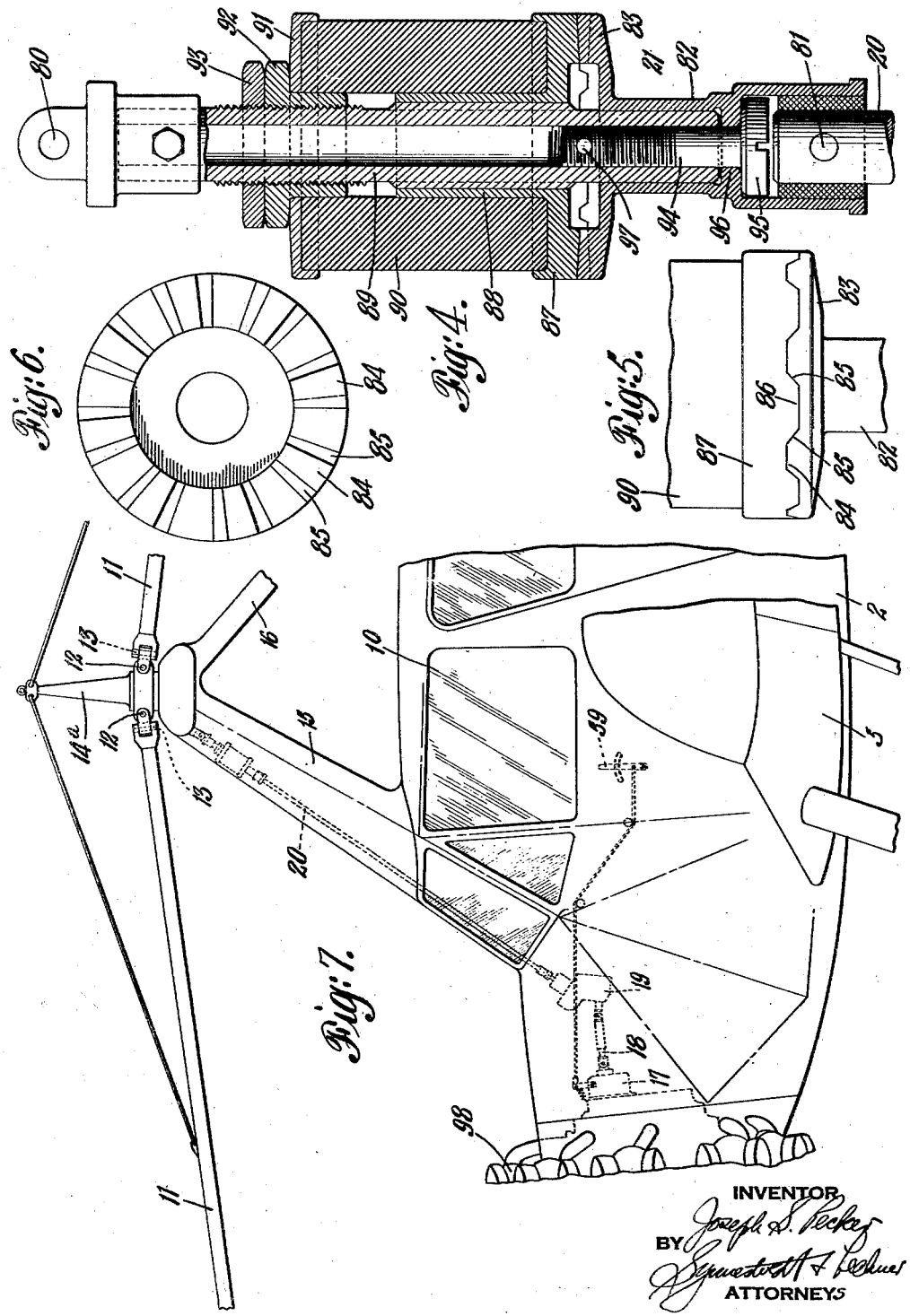

INVENTOR
Joseph S. Pecker
BY
ATTORNEYS

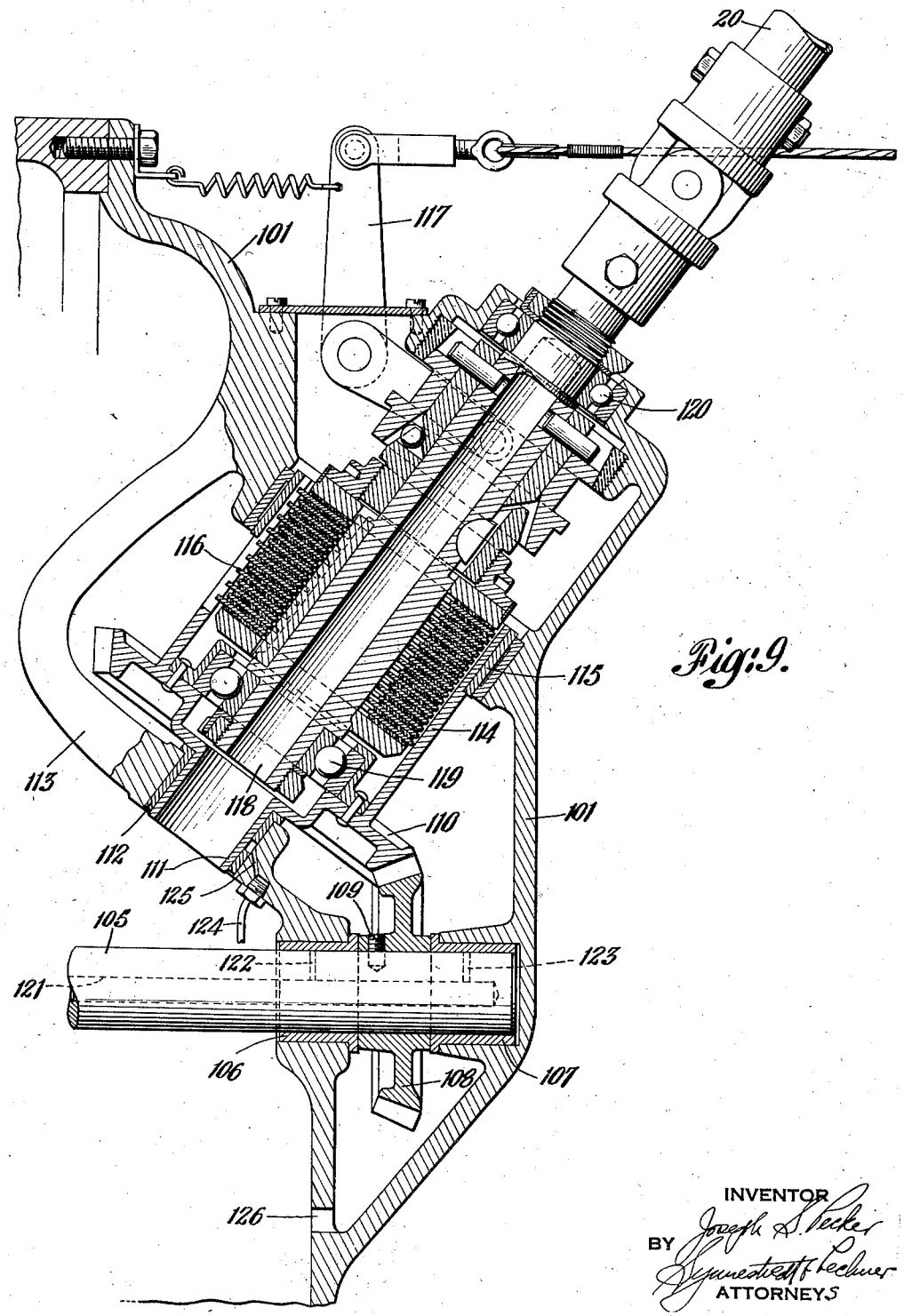

Patented June 23, 1936

2,045,051

UNITED STATES PATENT OFFICE 2,045,051

AIRCRAFT WITH AERODYNAMICALLY ROTATABLE WINGS

Joseph S. Pecker, Philadelphia, Pa., assignor to Autogiro Company of America, Willow Grove, Pa., a corporation of Delaware Application October 28, 1932, Serial No. 639,975

8 Claims. (Cl. 244—19)

This invention relates to aircraft with aerodynamically rotatable wings and more particularly to starter mechanism for the rotary wings and to a forward propulsion engine and its structural and operating relationships to the starter mechanism.

Before considering the particular objects and advantages of the present invention, some consideration should here be given to the general structure and operating conditions of an aircraft of the autorotative wing type. In such an aircraft, the wings are arranged on a rotative hub in such position that the relative air-flow of flight maintains said wings in rapid rotation, and the wings are further preferably pivotally or otherwise flexibly mounted on said hub so as to be free to accommodate themselves, as by oscillation or swinging, to variations in lift and other flight forces. Normally independent of the wings or sustaining rotor is the power plant or forward propulsion engine, the location of which with respect to the rotor hub or head will be different in different machines, and the angularity of the axis of which with respect to the axis of the rotor will also vary in different machines.

To bring the rotor, prior to take-off, up to a rotational speed such that autorotation or, in other words, aerodynamic actuation of the wings will continue by virtue of the relative flight wind, I have heretofore devised mechanism for delivering power from the forward propulsion engine (ordinarily located in the nose of the craft) to the axis member or hub of the rotor (ordinarily mounted at some distance above the body of the craft), certain embodiments of such mechanism being disclosed and claimed in my copending application Serial No. 512,383, filed January 30, 1931, issued as Patent No. 1,999,636. Such rotor drive or starter mechanism has been devised to meet certain problems and conditions peculiar to this type of craft, as more fully set forth in said copending application, and when constructed in accordance with said disclosure, such starter mechanism employs certain mechanical drive connections between the power plant and the normally air driven rotor, with a manual clutch for the starter, reduction gearing for the transmission of the power, and an overrunning device whereby the rotor will at all times be free to overrun the drive connections under the influence of relative air-flow.

The present invention is directed to certain advantageous improvements over such prior mechanisms, and especially to improvements looking toward the simplification, reduction in cost and maintenance, and minimization of weight, of rotor starter mechanisms; the ready adaptability of a given mechanism to different general combinations of engine and rotor, different relative locations thereof, and different angularities between their axes.

The present invention further contemplates simplification of the mounting and connection of the rotor starter on and with the forward propulsion engine; greater compactness of the structure; and improvements in the engine itself, as well as the rotor starter, as by directly associating part of the starter with the engine casing and its lubrication system.

More specifically, I contemplate mounting or recessing a portion of the starter mechanism directly in the engine itself, and I particularly contemplate an integrated arrangement of the aircraft engine and the rotor starter clutch and/or reduction gearing, as well as the lubrication means, starter shaft bearings, etc.

Other features of the invention involve, in one embodiment thereof, a separation of the clutch and the reduction gearing into two separate units, separately housed and mounted, with the reduction gearing located at the juncture of a drive shaft extending generally horizontally from the engine and a driven shaft extending generally upwardly to the rotor hub; and this, preferably in association with flexible and sliding joints in said shafts, in such manner that the angularity between the shafts and the length of the shafts may be varied, to suit different machines, which variations, within certain limits, can be accomplished without even substituting different bevel gearing. By the foregoing I am also enabled to locate the drive shafts and other parts in the most favorable position to cooperate with structural members of the fuselage and rotor mounting pylon, for improvement of support, streamlining, vision, etc.

Further objects of the invention involve the minimization of the number of gears necessary to effect a drive connection between the engine and the rotor and to accommodate the angularities of their axes; the provision of a novel means for limiting the torque imposed upon certain parts of the driving mechanism and upon the rotor; and the provision of means for preventing excessive end thrusts on the rotor starter shafting. Still other objects and advantages will occur to those skilled in the art.

In the drawings—

Figure 1 is a somewhat diagrammatic side elevational view of an autorotative wing aircraft embodying one form of the present invention;

Figure 2 is an enlarged longitudinal vertical section through part of the rotor starter mechanism, and particularly illustrating the mounting or recessing of the starter clutch in the casing of the propulsion engine;

Figure 3 is a vertical sectional view of the reduction gear unit, which in Figure 1 is mounted at some distance behind the clutch unit of Figure 2;

Figure 4 is a vertical section through the torque limiting device, which is located near the rotor hub in Figure 1;

Figure 5 is a fragmentary side elevation of two cooperating toothed parts of the torque limiting device of Figure 4;

Figure 6 is a face view of one of the parts of Figure 5;

Figure 7 is a fragmentary view similar to Figure 1, but on a somewhat larger scale, and showing the starter mechanism of Figure 1 applied to an aircraft where the propulsive engine is located closer to the projected line of the rotor axis than it is in Figure 1;

Figure 9 is a fragmentary longitudinal vertical section through the rotor clutch and engine unit of Figure 8.

Figure 8:
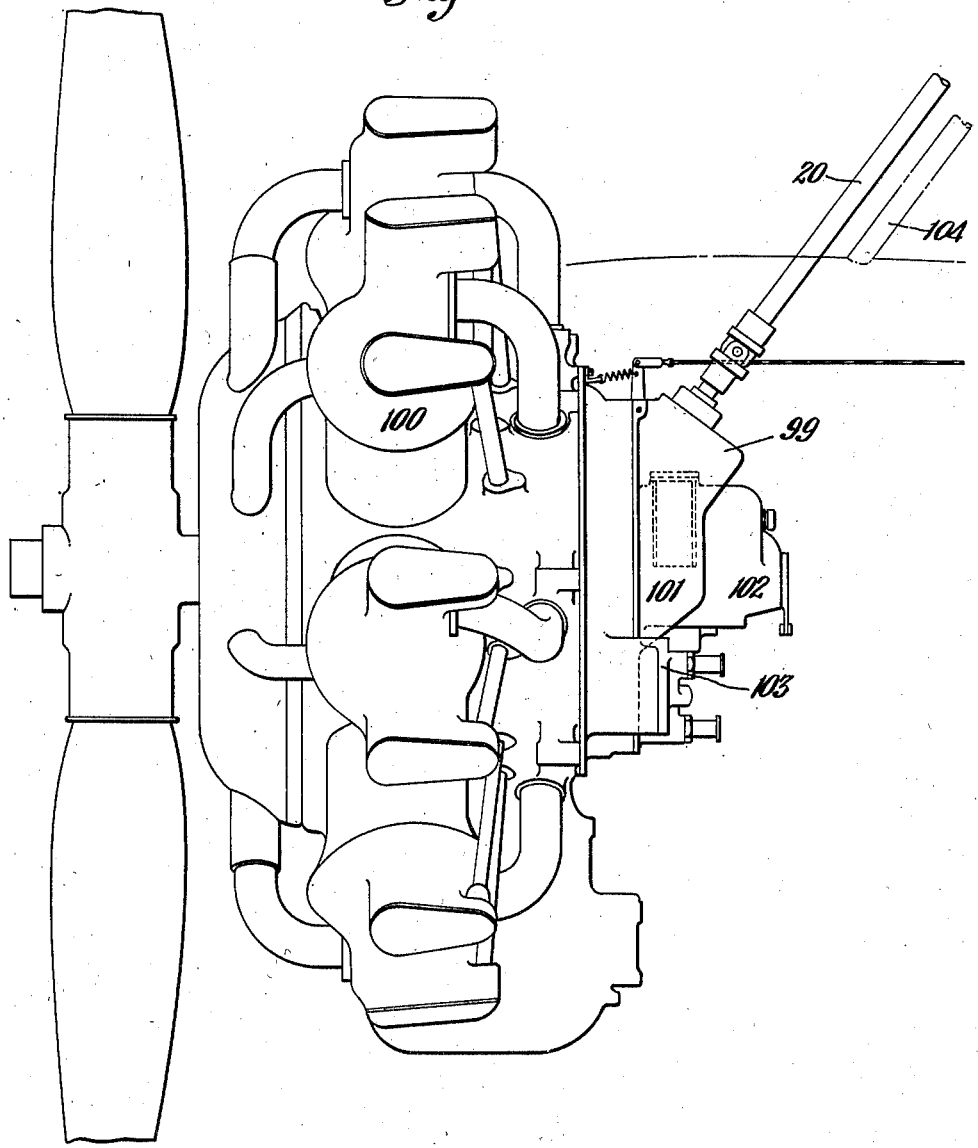
Figure 8 is a view on a still larger scale of a modified engine and starter unit, adapted especially for arrangements where the engine is still closer to the rotor axis than in Figure 7.

In Figure 1 the body 2 of the aircraft is provided with a forward propulsion engine and propeller 3, 4, control surfaces 5, 6, 7, undercarriage 8, 9, cabin 10, and rotative wings 11 which latter are only fragmentarily shown.

The wings 11 are set at an incidence which is within the autorotational range (not exceeding about five or six degrees positive in the present preferred construction, which is disclosed in the copending application of Juan de la Cierva, Serial No. 500,064, filed December 4, 1930 which issued as Patent No. 1,947,901), and these wings are preferably articulated as by horizontal and vertical pivots 12 and 13 to a common head, hub or axis structure 14 which is mounted for normally free rotation, above the body of the craft, as by means of pylon legs 15 and 16.

The rotor starter mechanism of the present invention, considered only in general, includes a power take-off unit 17, at least partially mounted or recessed in the casing of the engine 3, a drive shaft 18, reduction gearing 19, a driven shaft 20, a torque limiting device 21, and an upper unit (which may include an overrunning clutch) associated with the rotor hub and indicated generally by the reference character 22. The power take-off unit 17 of the rotor starter may be located in axial alignment with the crank shaft 23 of the engine, or, as shown, offset therefrom.

As seen in Figure 2, the rear portion or cover of the engine casing is indicated at 3a, and around the periphery of the engine there may extend an intake manifold, part of which is shown at 3b. A gear, fragmentarily shown at 24, may be mounted at the rear end of the engine crank shaft 23 and is in constant mesh with a gear 25 mounted on or formed integrally with a secondary shaft 26 in the engine casing. The engine casing has a pocket or recess, shown at 27, at the inner end of which is formed a bearing support 28, carrying a bearing 29 in which the shaft 26 rotates, and I preferably lubricate said bearing from the force feed system of the engine, as by means of an oil pipe 30.

The rotor starter clutch 31 is insertible from the rear of the engine into the recess 27, the rings of said clutch being in surrounding relation to a shaft 32 having an inner bearing 33 which is carried or retained by a flange 34 secured to the gear member 25. The outer bearing 35 for said shaft 32 is mounted in a casing member or extension 36 which may be bolted over the back of the recess 27 as by means of bolts 37. The driving plates 31a of the clutch are in splined relation to slots 38 extending longitudinally of the clutch enclosing sleeve 39 which is here shown as being integral with the gear 25; and the driven plates 31b of the clutch are arranged in splined relation to shaft 32 as by means of a key or keys 40. Floating discs 41 are shown as being interposed between the driving and driven discs of the clutch, and these may be of soft metal and asbestos composition, which gives good wearing, heat resisting, and frictional qualities.

At the outer end the clutch discs are backed by a ring 42, and at the inner end by a ring 43; the ring 43 being preferably fixed on shaft 32, and the ring 42 being slidably keyed thereon as by means of the collar members 44, 45 and the key 46.

A fixed collar and a slidable collar 47 and 48 and the slidable clutch collar 45 may have cooperating wedge faces 49, 50 and 51, which form pockets for the balls 52, of which there are a plurality in spaced relation peripherally of the shaft 32.

The engagement of the clutch is effected by pulling upon the operating cable 53 which is connected to the lever 54 fixed on shaft 55, which is mounted transversely in the casing extension 36. Inside the casing is another lever 56 which is forked to engage the groove 57 and the slidable collar 48. Sliding of the collar 48 to the left exerts a pressure upon the clutch discs which is uniformly distributed therearound by means of the series of balls 52; and upon engagement of the clutch the shaft 32 is rotated, which transmits rotation to the rotor starter shaft 18, through the intermediation of the universal or flexible joint 58.

The operation of the clutch is readily effected by means of the small hand lever or control device 59 in the cabin 10, and the release of the clutch is ensured by a return spring 60 (Figure 2).

It will be observed that collars 44 and 45 are threaded together, to permit of adjustment of the clutch. Such adjustment may be made by removing the small cover plate 61 and inserting a suitable tool for engagement in holes 62 of the clutch ring 44. When the clutch is in disengaged position, the rotatable and sliding ring 48 moves outwardly into wedging engagement with the frictional ring 63, which serves as a brake to prevent the clutch from creeping around by any slight friction which may exist between the clutch discs when the clutch is disengaged.

Proceeding now to Figure 3, the drive shaft 18 of the rotor starter is connected by a slip joint 64 and a second universal joint 65 to a short shaft 66 which is mounted by means of bearings 67 and 68 in the casing structure 69 of the reduction gear unit. A bevel driving pinion 70 is fixed on said shaft 66 and is in constant mesh with a bevel driven gear 71 mounted at the lower end of the short shaft 72 which is carried in the casing cover 69a by means of bearings 73 and 74.

It should here be observed that the flange structure 69b of the gear casing may be secured directly or through the intermediation of bracket devices 75 and 76 to structural members 77 and 78 of the fuselage. A separate, but sturdy, detachable mounting for the reduction gear casing is thus provided. End thrusts on shafts 66 and 72 are taken by the bearings 68 and 74 (Figure 3); while end thrusts on shaft 32 (Figure 2) under the action of the clutch, are taken by the bearing 33.

From shaft 72, the drive to the rotor is completed by means of the universal joint 79, the main driven shaft 20, the torque limiting device 21, and a second universal joint, part of which is indicated at 80 in Figure 4. The connection of the latter to the rotor hub itself may be in accordance with my copending application above referred to, and therefore need not be described here in detail.

Turning now to the torque limiting device shown in Figures 4 to 6 inclusive, it will be seen that the shaft 20 is coupled as by a pin 81 to a tubular shank 82 having a flanged portion 83 with teeth 84 formed on the inclined faces 85. These interfit with corresponding teeth 86 formed on the collar 87, which latter has a sleeve 88 slidably splined on shaft 89. A rubber cylinder 90 surrounds the shaft 89 and at its lower end is cupped into the collar 87. At its upper end pressure may be applied to the rubber cylinder 90 by means of a retaining plate 91, adjusting nut 92 and lock nut 93. The shaft 89 is, of course, connected with the universal joint part 80.

It will now be evident that with the adjusting nut 92 set to provide a given pressure upon the rubber 90, the teeth 84 and 86 will be interlocked and will transmit the drive from shaft 20 to shaft 89. If there is a torque overload, however, the teeth will slide, and jump out of mesh, the part 87, 88 compressing the rubber block 90, and it is evident that the adjustment can be made such as to give slippage at any desired torque.

In order to avoid a compression load on the drive shaft, I have provided an extension or bolt 94 connected into shaft 89 and having a head 95 which abuts against the internal shoulder 96 formed on the part 82. This leaves the shaft 20 free of all loads except driving torque load, and thus makes it possible to utilize a very small and light weight shaft. This shaft and bolt arrangement further ensures proper alignment of the parts. Assembly may be made by means of the threaded mounting of the bolt in the shaft, after which they may be locked in position by a pin 97.

Turning now to Figure 7, it will be seen that the arrangement of Figures 1 to 6 inclusive readily permits of the adaptation of the mechanism to a machine in which the engine 98 is located closer to the axis of the rotor hub 14a. Within certain limits of variation in the relative location of engine and rotor, the same starter parts, including shafting and gear casing, may be used, the universal joints taking care of such changes of shaft angularity as result from the telescoping or shortening of the shaft 18 for example, all as shown in Figure 7. However, the mechanism is adapted to greater variations, particularly of angularity between shafts 18 and 20, by the mere substitution of a reduction gear unit having bevel gears of different angularity, and with no change in the starter unit associated with the engine or in the starter unit associated with the rotor head.

In the modification of the invention shown in Figures 8 and 9, the unification of the rotor starter unit 99 with the engine 100 is even more complete than in the showing of Figures 1 and 2. In this construction, the rear cover or enclosure 101 of the engine crank case constitutes also the entire casing of the power take-off unit of the rotor starter. The said engine casing member 101 (as seen in Figure 8) is extended rearwardly between the engine accessories such as the magneto 102 and the oil pump 103, and the take-off of the rotor starter drive shaft 20 is at an upwardly and rearwardly extended angle, substantially paralleling the rotor pylon leg 104.

In Figure 9, it will be observed that the crank shaft 105 of the engine is journalled at the rear in bearings 106, 107 which are carried by the crank case cover structure 101. Between these bearings a driving pinion 108 is mounted on the engine crank shaft and secured as by a key or set screw 109. This pinion is in mesh with a driven gear 110, supported at its lower end by a tubular extension 111, and a bearing 112 mounted in the cage or spider 113, which latter is preferably integral with the engine casing member 101. Said gear 110 carries an upper extension in the form of a shell or cylinder 114 journalled in a bearing 115, which is also carried by the engine casing 101.

The clutch 116 is mounted in the cylindrical member 114, and when operated by the actuating lever 117, acts to engage the shaft 118 with the gear 110; said shaft being connected to the rotor starter shaft 20 (as in the previous construction) and being mounted in bearings 119 and 120. Further description of the clutch mechanism is not necessary, as it is quite similar to the clutch shown in Figure 2.

For lubricating various bearings and/or other parts of the power take-off unit, the passages 121, 122, 123, 124 and 125 may be provided, the same being fed from the oil pump of the engine. The oil may drip back into the crank case and thence to the oil sump, some of it directly, and some through the oil draining hole 126.

In connection with the modification just described, it will be seen that I obtain not only the most compact arrangement possible, but also a reduction in weight and cost of the engine and starter mechanism, by unifying the housings, the lubrication, and other features thereof. One complete set of gears, bearings, and associated parts is also eliminated by this arrangement. In other words, I need employ only one pair of gears at the engine, and one pair of gears at the rotor hub (not shown), and can eliminate the mechanism shown in Figure 3, which latter is employed in the structure of Figures 1 to 7.

In either form of the invention, however, there is a decided advantage in the compact, rigid and unified arrangement of power plant and rotor starter, as hereinbefore set forth.

I claim:—

1. For a rotary winged aircraft, a forward propulsion engine of the radial type, comprising a casing, power mechanism therein for driving a propeller, a manifold located peripherally of the casing adjacent the rear thereof, and a compact power take-off unit for the rotary wings, mounted in said casing in the space left within the inner peripheral confines of the manifold.

2. In an aircraft, the combination of a normally air-driven sustaining rotor mounted above the body of the craft, a forward propulsion prime mover, means for starting said rotor from said prime mover including a rotative starter shaft extending upwardly for connection to the rotor at a point spaced above said body, and a torque limiting device associated with said shaft and having means for preventing the imposing of appreciable end thrusts on said shaft.

3. In an aircraft, the combination of a normally air-driven sustaining rotor mounted above the body of the craft, a forward propulsion prime mover, means for starting said rotor from said prime mover including a rotative starter shaft extending upwardly for connection to the rotor at a point spaced above said body and supported at its lower end in the body and at its upper end by the rotor mount, a torque limiting device associated with said shaft, said device having parts relatively separable axially of the shaft and relatively rotatable when separated under the influence of excessive load, means urging said parts into engagement, and means relieving the shaft supports of end thrusts produced in said device.

4. In combination, in an aircraft, an engine for forward propulsion, a sustaining rotor having wing means located above the body of the craft in position to be normally aerodynamically driven in flight, the axis of the propulsive engine being at an angle to the axis of the rotor, drive shafting for delivering a torque from the propulsive engine to the rotor, means for connecting and disconnecting the drive to the rotor, and mechanism for effecting a speed reduction between the engine and the rotor and for accommodating the drive shafting to the angularity between the axes of engine and rotor, said mechanism comprising two pairs of gears only, one pair of said gears being beveled to accommodate the angularity between said shafting and the engine axis and being mounted to connect the lower end of the shafting to the axis of the engine and the other pair of gears being beveled to accommodate the angularity between said shafting and the rotor axis and being mounted to connect the upper end of said shafting to the rotor axis closely adjacent the plane of the rotative wing means.

5. In an aircraft having an engine for forward propulsion, a primary sustaining system comprising a rotative hub structure and rotative wing means flexibly mounted thereon in position to be normally aerodynamically actuated, a gear box horizontally removed from said engine and vertically removed from said rotor hub and independently fixed in the aircraft proper, driving connections from the engine to the gear box, driving connections from the gear box to the rotor hub, said connections having some relative adjustability, and a speed-reducing and overrunning device in the second of said driving connections closely adjacent the rotative wing means.

6. For an aircraft having a body or frame and an upwardly-extending structure for mounting a sustaining rotor, the latter being capable of autorotative actuation by relative air-flow, a main engine for propelling the aircraft having means for imparting a starting torque to said rotor including a clutch unit closely associated with and enclosed at least partially by the casing of said engine, a shaft extending rearwardly from said clutch, a second shaft inclined with respect to the axis of said engine and with respect to the axis of said rotor and extending upwardly to the rotor hub, a pair of bevel gears connecting the upper end of the second shaft to the rotor and a pair of bevel gears connecting the lower end of the second shaft to the rear of the first shaft, an enclosure or casing for said lower gears, and means for anchoring the latter casing to the frame of the aircraft in such a location that the upwardly extending shaft may be placed in an advantageous position as for example adjoining a member of the rotor supporting structure for streamlining therewith.

7. For an aircraft having rotary sustaining wings, a forward propulsion engine including a casing and having a main shaft extending out one end for driving a propeller, auxiliaries such as magnetos mounted on the other end of the casing, and means for imparting a starting torque to the rotary wings comprising a shaft mounted in bearings, with gear drive from said main shaft and having clutch means for disconnection of the drive, all of said rotary-wing starting parts being mounted in a portion of the engine casing at least partially recessed within the engine in a position above said main shaft and between such auxiliaries.

8. In an aircraft, a sustaining rotor, a rotative mounting therefor above the craft, an engine for forward propulsion of the craft, and means for imparting a torque to said rotor from said engine including a lower or driving unit associated with said engine for the take-off of power therefrom, an upper or driven unit associated with said rotor for the delivery of power thereto, and driving interconnections between said units including relatively angled shafts one of which is connected to the lower unit and the other of which is connected to the upper unit, and means for accommodating different relative locations of the power plant and rotor and different angularities between said two shafts, said last means comprising a third unit mounted in the craft independently of the engine and the rotor and including replaceable inter-engaging driving elements spaced from said upper and lower units, located at the angle of junction of said shafts, and adapted to drive one shaft from the other at an angle.

JOSEPH S. PECKER.